United States Patent
Marable

(10) Patent No.: US 6,469,424 B1
(45) Date of Patent: *Oct. 22, 2002

(54) IGNITOR FOR LIQUID FUEL ROCKET ENGINES

(75) Inventor: Robert W. Marable, Palm Beach Gardens, FL (US)

(73) Assignee: United Technologies Corporation, Hartford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,389

(22) Filed: Dec. 14, 1998

(51) Int. Cl.[7] .......................... H01T 13/02; H01J 17/26
(52) U.S. Cl. .................... 313/120; 313/231.01
(58) Field of Search .................... 313/120, 118, 313/143, 140, 11.5, 119, 231.01; 123/143 B, 143 R, 146.5 R, 179.9

(56) References Cited

U.S. PATENT DOCUMENTS

| 3,521,453 | A | | 7/1970 | Breen et al. ................ 60/207 |
| 3,707,916 | A | | 1/1973 | Meraz, Jr. et al. ......... 102/49.7 |
| 3,717,227 | A | | 1/1973 | Turner ..................... 102/49.7 |
| 3,861,137 | A | | 1/1975 | Russell et al. ......... 60/39.82 P |
| 5,211,142 | A | * | 5/1993 | Mathews et al. ........... 313/143 |
| 5,378,957 | A | * | 1/1995 | Kelly ................... 313/231.01 |

OTHER PUBLICATIONS

EP 99309723.7 Search Report.

* cited by examiner

Primary Examiner—Vip Patel
Assistant Examiner—Joseph Williams
(74) Attorney, Agent, or Firm—George J. Romanik

(57) ABSTRACT

An ignitor that energizes a hydrogen fuel into a high temperature plasma which is then injected into a mixture of fuel and oxidizer within a combustion chamber.

9 Claims, 3 Drawing Sheets

IGNITOR FOR LIQUID FUEL ROCKET ENGINES

TECHNICAL FIELD

This invention relates to ignitors for liquid fueled rocket engines, and more specifically, to ignitors which increase the reliability of engine re-lights on multiple ignition launches.

BACKGROUND OF THE INVENTION

Liquid fueled rocket engines are commonly used as upper stage propulsion systems on multiple stage launch vehicles. During a typical launch, for example, the placing of a satellite in near Earth orbit, an upper stage rocket engine may fire briefly, then coast, then fire again. Multiple firings of an engine during a single launch requires a highly reliable ignition system that is capable of multiple engine re-lights.

Ignition systems of the prior art typically include a supplemental oxidizer supply line to provide additional oxidizer to the region surrounding the engine's ignitor during ignition to ensure proper lighting for re-lighting of the fuel/oxidizer mixture in the rocket engine combustion chamber. While supplying additional oxidizer to the ignitor has proven to produce a desirable fuel/oxidizer ratio at ignition, the supplemental oxidizer supply line requires a shut-off valve to avoid over-heating. Combustion products back flow into the valve during the start-up pressurization of the engine, causing the valve to freeze closed. With the valve frozen closed for subsequent re-light attempts, the engine will not light reliably. Attempts to accommodate and/or eliminate back flow have proven to be ineffective at preventing freezing of the shut-off valve.

What is needed is an ignition system for liquid fueled rocket engines that increases the reliability of engine re-light on launches requiring multiple firings of the engine, while reducing the cost and weight of ignition systems of the prior art.

SUMMARY OF THE INVENTION

It is therefore an object of the present invention to provide an ignitor for liquid fueled rocket engines that increases the reliability of engine re-light on launches requiring multiple firings of the engine.

Another object of the present invention is to reduce the weight of the ignition systems for liquid fueled rocket engines.

Another object of the present invention is to reduce the cost of the ignition systems for liquid fueled rocket engines.

Accordingly, an ignitor for a rocket engine is disclosed having at least one first electrode, and at least one second electrode in spaced relation to the first electrode, defining a gap therebetween. The ignitor further includes means for selectively producing an electrical voltage between the first and second electrodes, and means for supplying a gaseous fuel into the gap. A method of using the ignitor is also disclosed.

The foregoing and other features and advantages of the present invention will become more apparent from the following description and accompanying drawings.

BEST MODE FOR CARRYING OUT THE INVENTION

Figure 1:
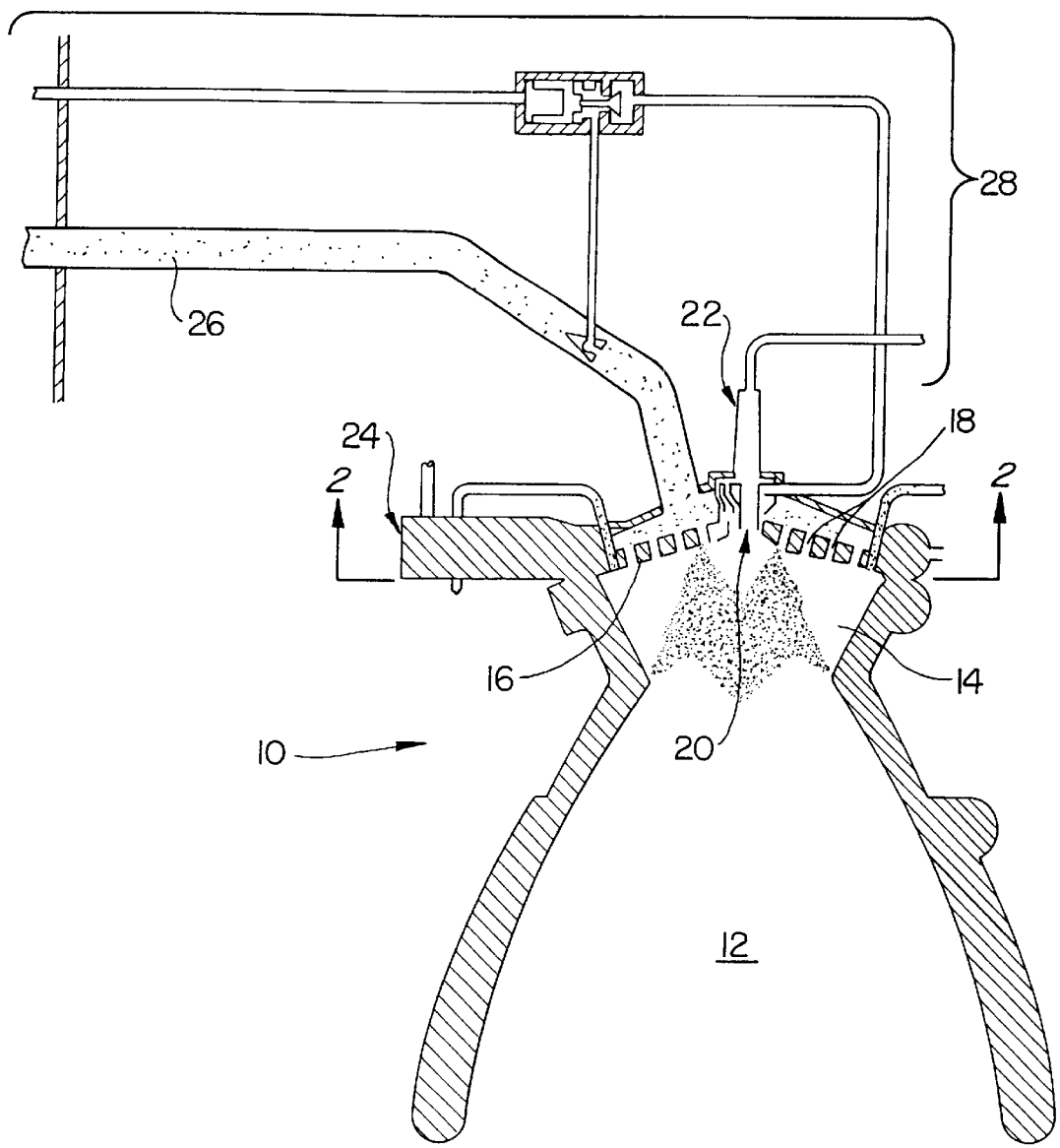
FIG. 1 is a schematic view of a rocket engine of the prior art.

As shown schematically in FIG. 1, a typical liquid fueled rocket engine 10 includes a thrust chamber 12, a combustion chamber 14 upstream of the thrust chamber 12, a faceplate 16 which contains a plurality of fuel/oxidizer injector elements 18 and an ignitor port 20. An ignitor 22 is mounted to the ignitor port 20, and a fuel supply line 24 and an oxidizer supply line 26 supply fuel and oxidizer to the fuel/oxidizer injector elements 18. A supplemental oxidizer supply system 28 is typically included for supplying additional oxidizer to the ignitor 22 during ignition.

Figure 2:
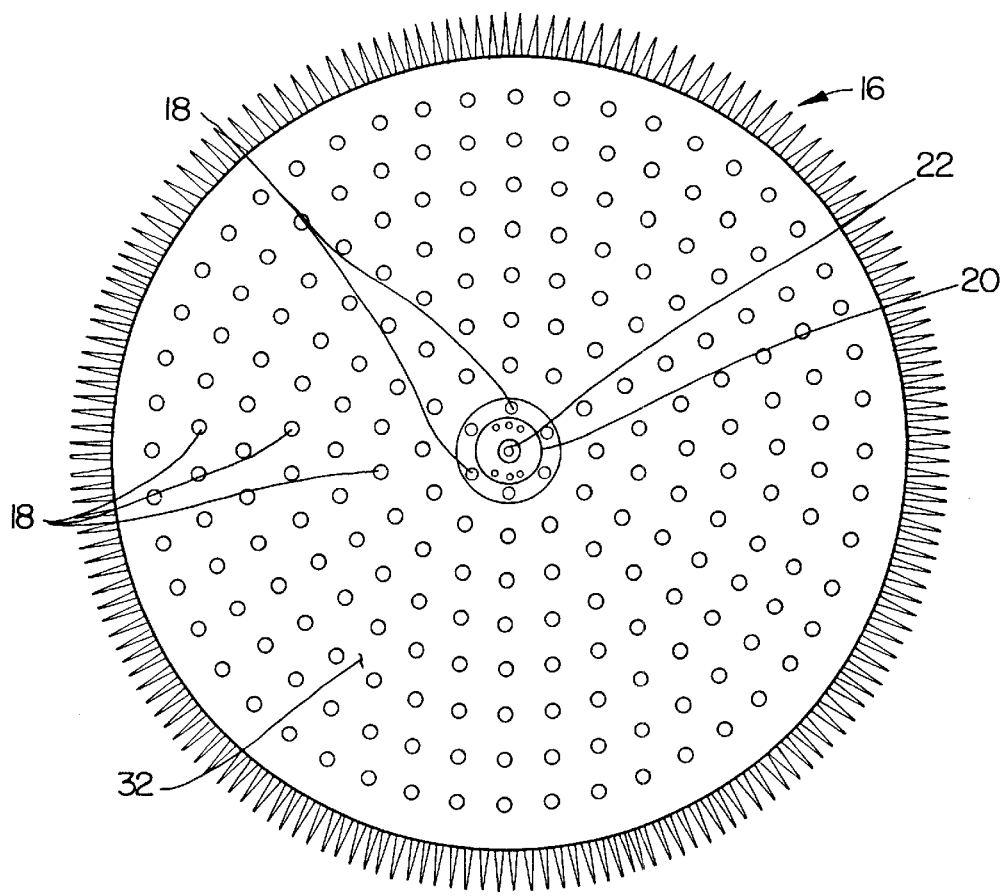
FIG. 2 is a plan view of the faceplate of the rocket engine of the prior art taken along line 2—2 of FIG. 1.
Figure 3:
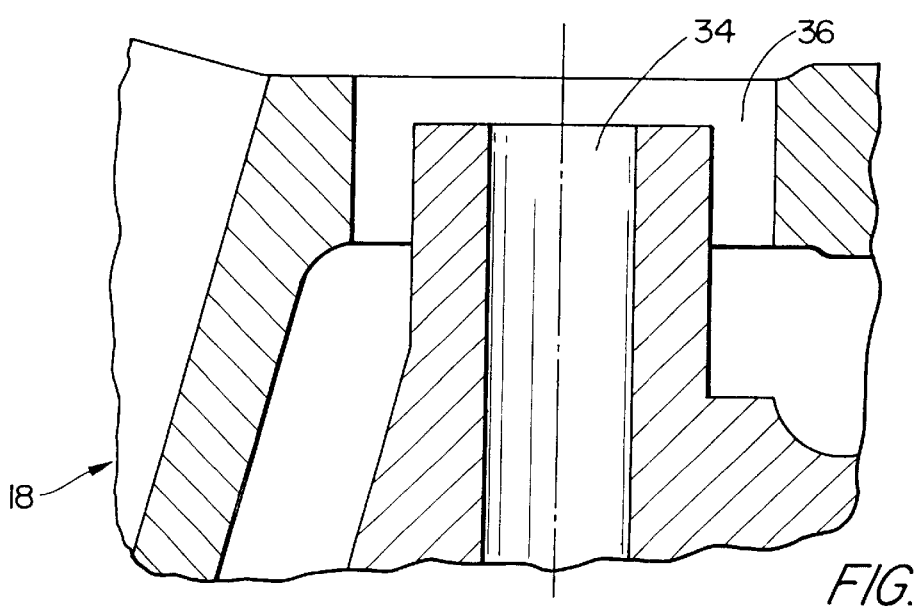
FIG. 3 is a cross-sectional view of one of the injector elements.

As shown in FIG. 2, the faceplate 16 of the rocket engine 10 has a centrally located ignitor port 20 and the ignitor 22 is mounted to the ignitor port 20. Radially outward of the port 20 are several annular rows of injector elements 18. Each of the injector elements 18 has a first orifice 34 defining a first flow area, and a second annular orifice 36 defining a second flow area, as shown in FIG. 3. The second annular orifice 36 is concentric with, and radially outward of, the first orifice 34 relative to the first orifice 34. Preferably, the first orifice 34 of each injector element 18 provides oxidizer to the combustion chamber 14, and the second annular orifice 36 provides fuel to the combustion chamber 14.

Figure 4:
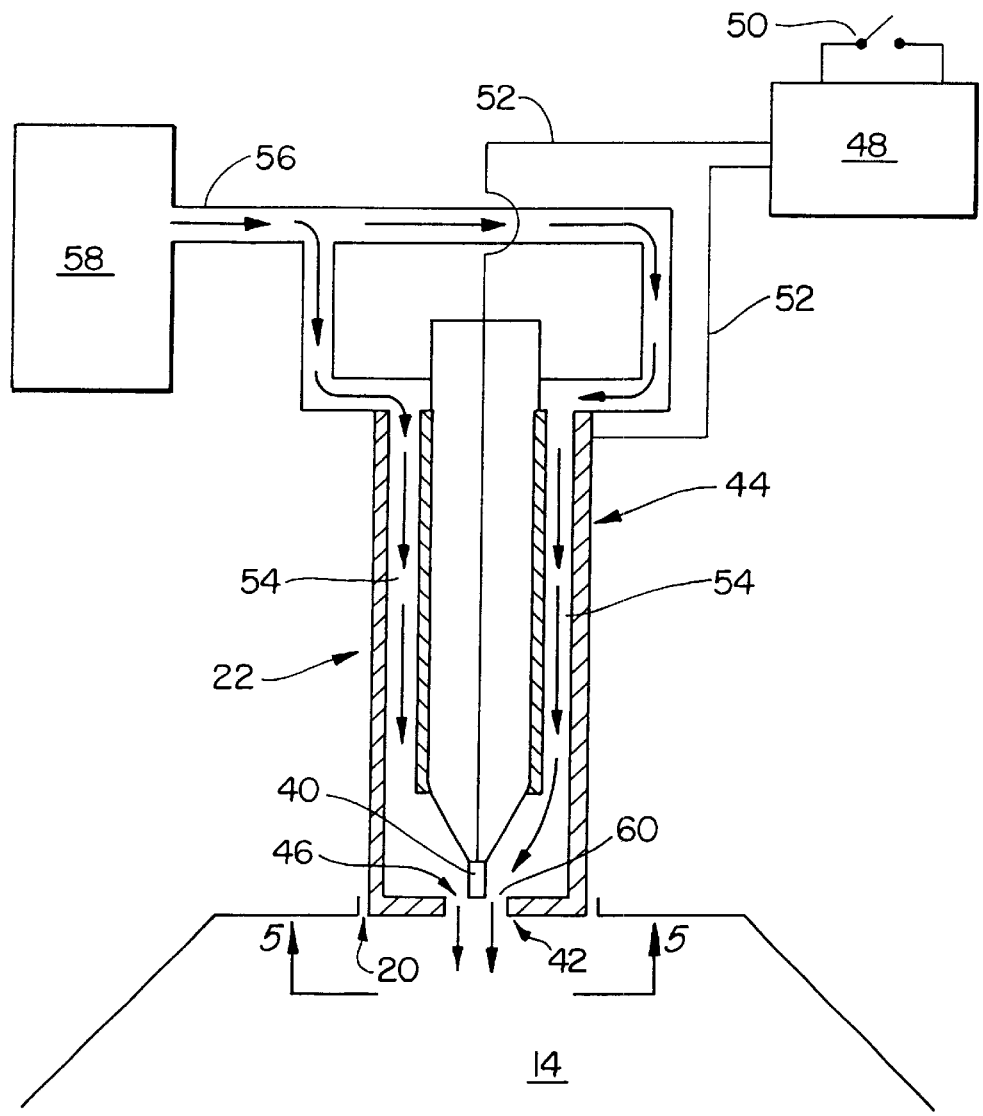
FIG. 4 is a schematic view of the ignitor of the present invention.
Figure 5:
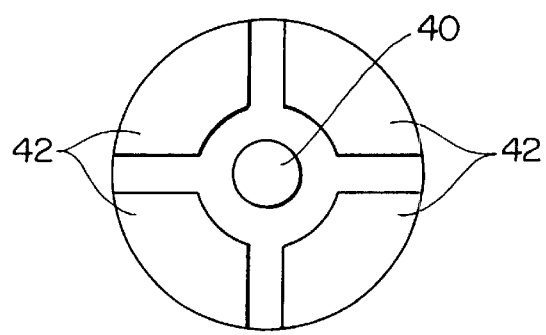
FIG. 5 is an end view of an alternate design using multiple second electrodes taken along line 5—5 of FIG. 4.

The ignitor 22 of the present invention is shown schematically in FIG. 4 and includes at least one first electrode 40, and at least one second electrode 42 radially outward from the first electrode 40. The first and second electrodes 40, 42 are fixedly secured to an ignitor body 44, and the second electrode 42 is in spaced relation to the first electrode 40, defining a gap 46 therebetween. The second electrode 42 may be a single electrode that completely encircles the first electrode 40, as shown in FIG. 4, but preferably a plurality of the second electrodes 42, located equidistant from the first electrode, encircle the first electrode 40, as shown in FIG. 5.

Referring back to FIG. 4, a power apparatus 48, such as a generator or power supply controlled by a switch 50, selectively produces an electrical voltage between the first and second electrodes 40, 42 to energize gaseous fuel, as described in greater detail below. The power apparatus 48 is capable of supplying electrical voltage of at least 15,000 volts to the electrodes 40, 42. A first electrical circuit 52 feeds electrical voltage through the first and second electrodes 40, 42.

A gaseous fuel, such as hydrogen, is supplied into the gap 46 through one or more passages 54 that extend through the ignitor body 44. Each passage 54 has a first end 56 connected to a gaseous fuel source 58, and a second end 60 located adjacent the gap 46. As used herein, the term "gaseous fuel" means vaporized hydrogen, or a vaporized hydrocarbon, and does not include known oxidizers of hydrogen or hydrocarbons, such as oxygen.

Immediately prior to engine ignition, fuel and oxidizer are fed to all of the injector elements 18 by the fuel supply line 24 and the oxidizer supply line 26, respectively. Fuel spray from the second annular orifice 36 of the injector elements 18, and oxidizer spray from the first orifices 34 of the injector elements 18, form a mixture that is directed toward the ignitor port 20, thereby providing a combustible fuel/oxidizer mixture. Fuel from the fuel supply 58 flows in gaseous form through the passages 54 and into the gap 46, thereby purging the ignitor body 44 and the gap 46 of oxidizer. At engine ignition, the switch 50 is triggered to flow a high voltage electrical current between the first and second electrodes 40, 42. The electrical voltage energizes the gaseous fuel in the gap 46, thereby converting the gaseous fuel into a high temperature plasma. The temperature of the plasma is significantly greater than the threshhold temperature necessary to initiate combustion, but since all of the oxidizer has been purged from the passages 54 and gap 46, no oxidation of the plasma occurs within the ignitor body 44 or gap 46. Instead, pushed by the continuing flow of gaseous fuel from the fuel supply 58, the high temperature plasma is driven out of the gap 46 and into contact with the fuel/oxidizer mixture in the combustion chamber 14. Due to its highly energized state, the high temperature plasma instantly reacts with the oxidizer in the fueloxidizer mixture, thereby initiating combustion of the mixture.

As those skilled in the art will readily appreciate, rocket engines incorporating the ignitor of the present invention avoid both the cost and ignition problems associated with the supplemental oxidizer supply system 28 of the prior art, while eliminating the weight of the supplemental oxidizer supply system 28 from the rocket engine.

Although this invention has been shown and described with respect to a detailed embodiment thereof, it will be understood by those skilled in the art that various changes in form and detail thereof may be made without departing from the spirit and scope of the claimed invention.

I claim:

1. An ignitor for liquid fueled engines comprising:

at least one first electrode;

at least one second electrode radially spaced from said first electrode, said second electrode in spaced relationship to said first electrode defining a gap therebetween;

means for supplying a gaseous fuel into said gap and purging said gap of oxidizer; and means for selectively producing an electrical voltage between said first and second electrodes such that said electrical voltage energizes said gaseous fuel to convert said gaseous fuel into a high temperature plasma.

2. The ignitor of claim 1 wherein said means for selectively producing an electrical voltage between said first and second electrodes comprises a first circuit, said first circuit comprising a switchable power supply that feeds electrical voltage through said first and second electrodes.

3. The ignitor of claim 2 wherein said electrical voltage is at least 15,000 volts.

4. The ignitor of claim 3 wherein said second electrode encircles said first electrode.

5. The ignitor of claim 4 further comprising an ignitor body, and said first and second electrodes are fixedly secured to said ignitor body.

6. The ignitor of claim 5 wherein said means for supplying a gaseous fuel into said gap and purging said gap of oxidizer comprise a passage that extends through said ignitor body, said passage having a first end and a second end, said first end connected to a gaseous fuel source and said second end located adjacent said gap and a combustion chamber.

7. The ignitor of claim 3 wherein a plurality of said second electrodes are located equidistant from said first electrode.

8. The ignitor of claim 7 further comprising an ignitor body, and said first and second electrodes are fixedly secured to said ignitor body.

9. The ignitor of claim 8 wherein said means for supplying a gaseous fuel into said gap comprise a passage that extends through said ignitor body, said passage having a first end and a second end, said first end connected to a gaseous fuel source and said second end located adjacent said gap.

* * * * *